F. A. KUNTZ.
HEATING AND VENTILATING SYSTEM.
APPLICATION FILED AUG. 20, 1915.

1,193,271.

Patented Aug. 1, 1916.
2 SHEETS—SHEET 1.

WITNESSES:
René Bruine
Harry M. Brand

INVENTOR:
Frank A. Kuntz,
By Attorneys,
Fraser, Funk & Myers

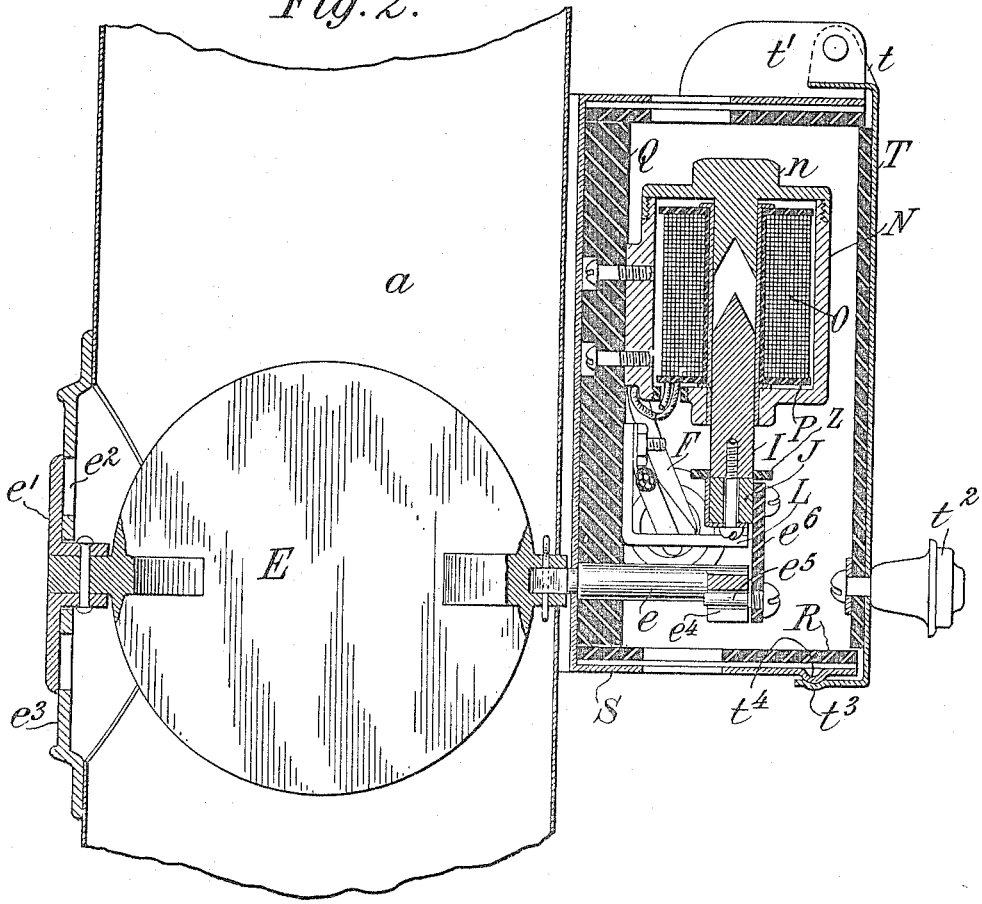
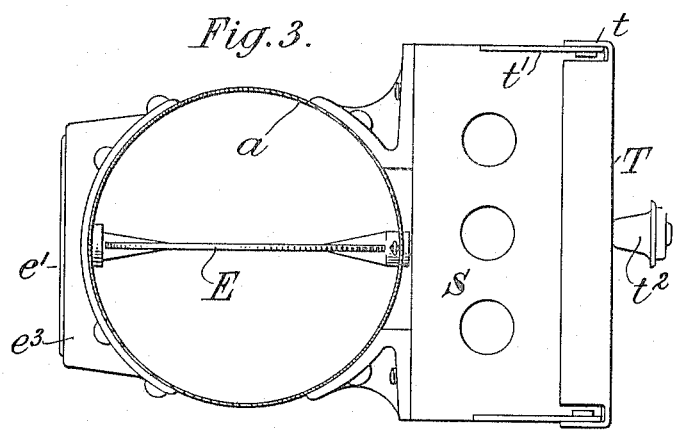

UNITED STATES PATENT OFFICE.

FRANK A. KUNTZ, OF NEW YORK, N. Y., ASSIGNOR TO GOLD CAR HEATING & LIGHTING COMPANY, OF NEW YORK, N. Y., A CORPORATION OF NEW YORK.

HEATING AND VENTILATING SYSTEM.

1,193,271.  Specification of Letters Patent.  Patented Aug. 1, 1916.

Application filed August 20, 1915. Serial No. 46,518.

*To all whom it may concern:*

Be it known that I, FRANK A. KUNTZ, a citizen of the United States, residing at Richmond Hill, borough of Queens, city and State of New York, have invented certain new and useful Improvements in Heating and Ventilating Systems, of which the following is a specification.

My invention relates to heating and ventilating systems and aims to provide improved means whereby the draft is regulated, and at the same time the supply of air to the air heating chamber of the heater is controlled.

Figure 1:
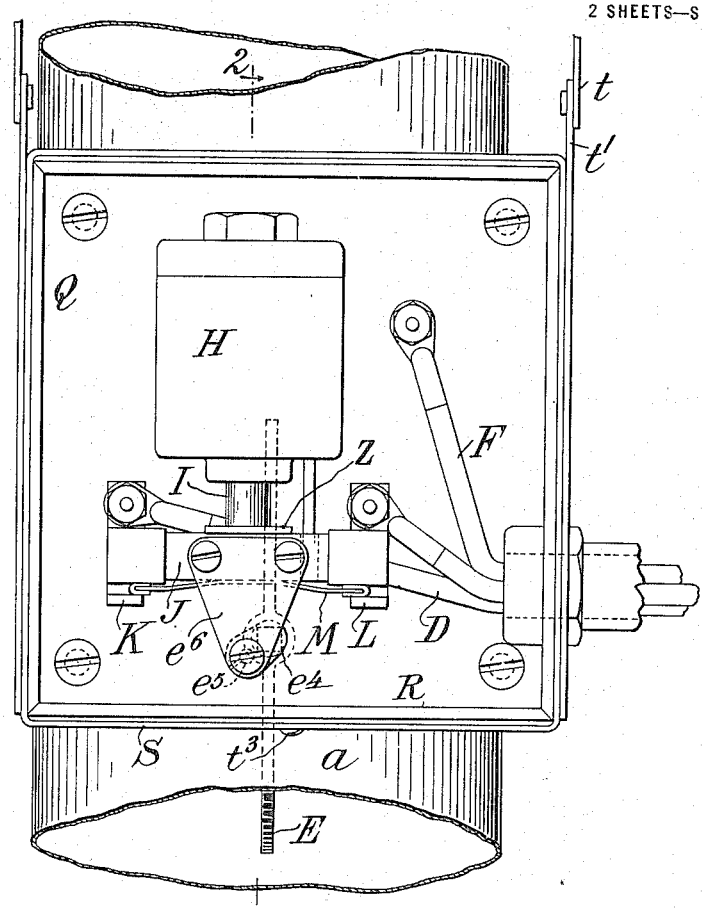
Figure 4:
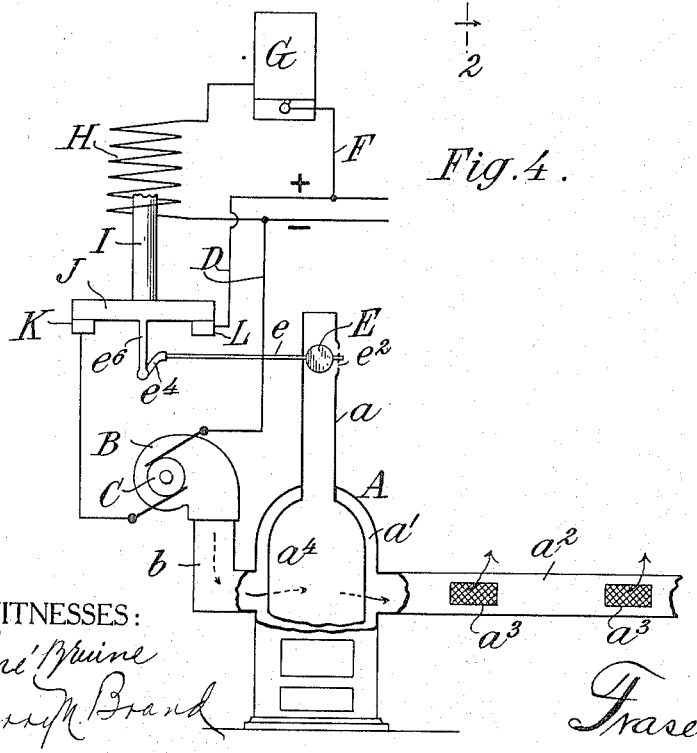

A desirable form in which my invention may be embodied is illustrated in the accompanying drawings, wherein, Figure 1 is a plan view of electromagnetic operating means used in connection with my system, partly broken. Fig. 2 is a section thereon on the line 2—2 of Fig. 1. Fig. 3 is a top view of Fig. 1, and Fig. 4 is a diagram illustrating one use of my invention.

According to my invention the heater A, which may be any heat producing furnace or stove, consuming fuel and therefore requiring a stack, is provided with a stack $a$, and has the usual heating chamber $a^1$ from which the heated air is conducted by conduits $a^2$ to the desired point, as, for instance, registers $a^3$. A centrifugal fan or blower B supplies air to the chamber $a^1$ through conduit $b$ and is driven by an electric motor C. The electric motor C is included in a main electric circuit D. The stack $a$ contains the usual damper E, and on the shaft $e$ of this damper is a perforated disk $e^1$, the perforations in which are adapted to aline with similar perforations $e^2$ in a plate $e^3$ covering an opening in the side of the stack when the damper E is closed, and to close the openings $e^2$ when the damper is open.

Means are provided by me for simultaneously controlling the damper E and the blower B.

The controlling means are operated in a shunt circuit F, which includes a thermostat G. The particular type of thermostat forms no part of this invention, and is therefore not illustrated. Many types of thermostats appropriate for this purpose are known, and this thermostat is of a type adapted to be affected by the temperature of the apartment in which the same is contained, and to close the shunt circuit F when the temperature of the apartment rises sufficiently high, and to open the shunt circuit when the temperature drops below the desired point. In the shunt circuit is also contained an electromagnet, illustrated as a solenoid H, the construction of which is shown in detail in the sectional view, Fig. 2. The core I of this solenoid is attached to a bridge piece J, and this bridge piece is adapted to close the circuit between two contact jaws K and L in the main circuit D when the solenoid H is deënergized, and to break the said circuit when the solenoid is energized.

The shaft $e$ of the damper E has a crank $e^4$ thereon which is connected by a connection $e^6$ to the bridge piece J. Suitable means are provided to enable the movement of the bridge piece J to turn the damper E, and such means take the form of a pin and slot connection $e^5$ between the said parts, as seen in Fig. 2, whereby the requisite lost motion is obtained.

I prefer to employ in connection with my heating and ventilating system the automatic switch illustrated in my application filed August 19, 1915, Serial No. 46,283, but the said switch is not claimed here, but is claimed in my said companion application. In the construction of the said switch the bridge piece J is formed of magnetic metal and is attached to the core I so as in effect to become a part thereof, and thereby the magnetic field is extended, and when the magnet is energized so as to lift the said bridge and break the main circuit D, the said bridge piece acts as a magnetic blowout, and the lines of flux will extinguish or destroy the arcs which would otherwise exist between the bridge J and the contacts K and L. In connection with the said bridge I prefer to make contact with the contact jaws K, L by means of a phosphor-bronze brush M which has spring motion and gives the desired wiping contact when the circuit is closed.

The solenoid H is provided with a shell N which may be of cast iron, and has threaded thereon a cap $n$, the inner part of which acts as a part of the core I. The coil O is suitably connected to the wires of the shunt circuit F and is situated within a bobbin P which may be formed of fiber or bakelite. The solenoid is supported upon a backing of suitable insulating material, such as the slate plate Q. It is surrounded by an asbestos lining R and is situated within a cabinet S, which may be formed of pressed steel and has a cover T having lugs *t* which are pivotally supported on corresponding ears $t^1$ on the side of the cabinet. This cover has a finger piece $t^2$ and is held in place by bosses $t^3$, $t^4$ on the cover and body respectively.

The core of the magnet is provided with a washer Z which, when the magnet is energized, acts as a stop by contacting with the shell N. This sudden stoppage of the core causes a violent vibration of the brush M, which assists in blowing out arcs that would otherwise exist between the bridge J and the contact jaws K, L.

The operation of my device is as follows: When the temperature in the apartment to be heated falls to a point indicating that more heat is desired, the thermostat G breaks the shunt circuit F; thereupon the core I drops and the bridge J makes contact with the contact jaws K, L, closing the main blower circuit D and starting the blower B and causing a current of fresh air to flow into the heater A and out through the registers $a^3$. At the same time the bridge J turns the damper E so as to open the same and cause a draft through the fuel chamber $a^4$, thereby heating the air which is supplied from the blower. When the apartment becomes sufficiently heated the thermostat J closes the shunt circuit F, whereupon the solenoid H is energized and the core I is lifted, breaking the motor circuit D and reversing the position of the damper E, and at the same time opening the stack vents $e^1$ $e^2$. When the core I is lifted the magnetic lines of flux then flowing will extinguish arcs which would otherwise be formed between the magnetic bridge J and the contact jaws K, L. The energizing of the magnet will have lifted the core I until the washer Z strikes the shell N, which it does with a sudden blow, causing violent vibrations of the brush M, and these vibrations assist in fanning or slapping out the said arcs.

I prefer to construct the bridge of iron, and the contact jaws K, L may be made of copper.

The blower B may be of any approved construction, such as a centrifugal fan or blower; the solenoid H is preferred, although another form of electromagnet employing an armature might be used.

My invention is not limited to the particular means for operating the damper and blower illustrated, although I prefer such means, nor is the invention limited to the particular connections between the bridge and damper, as these details of construction may be changed within the limits of the appended claims.

What I claim is:—

1. In a heating and ventilating system, a stove, a stack therefor, a damper in the stack, a blower adapted to supply air to an air heating chamber in the stove, an electric motor for the blower, an operating circuit for said motor having separated contact jaws, a shunt circuit, a thermostatic controller therein affected by the temperature of the surrounding atmosphere, an electromagnet in said shunt, a bridge operatively connected to the moving part of the said electromagnet and adapted to engage said contacts and close the motor operating circuit, and an operating connection from said moving part to said damper, whereby when the thermostatic controller changes the condition of the shunt, the electromagnet is caused to correspondingly operate the blower and damper.

2. In a heating and ventilating system, a stove, a stack therefor, a damper in the stack, a blower adapted to supply air to an air heating chamber in the stove, an electric motor for the blower, an operating circuit for said motor having separated contact jaws, a shunt circuit, a thermostatic controller therein affected by the temperature of the surrounding atmosphere, an electromagnet in said shunt, a bridge of magnetic metal attached to the core of said electromagnet and adapted to engage said contacts and close the motor operating circuit, and an operating connection from said moving part to said damper, whereby when the thermostatic controller closes the shunt the magnet is energized and the bridge closes the damper and breaks the blower circuit and acts as a magnetic blowout to destroy arcs.

3. In a heating and ventilating system, a fuel consuming stove, a stack therefor, a draft regulator therein, means for supplying air to an air heating chamber in the stove, electric driving means therefor, a main circuit including said driving means, a bridge adapted to close said main circuit and having an operating connection to said damper, a shunt circuit, means for opening and closing the shunt, an electromagnet in the shunt, and an operating connection from the moving part of said electromagnet to said bridge.

4. In a heating and ventilating system, a fuel consuming stove, a stack therefor, a draft regulator therein, means for supplying air to an air heating chamber in the stove, electric driving means therefor, a main circuit including said driving means, a bridge made of magnetic metal and adapted to close said main circuit and having an operating connection to said damper, a shunt circuit, means for opening and closing the shunt, a solenoid in the shunt and a connection between the core thereof and said bridge whereby when said controlling means opens the shunt the magnet is deënergized and the bridge opens the draft regulator and closes the main circuit, and when the controlling means closes the shunt the magnet is energized and the bridge closes the draft regulator and breaks the main circuit and at the same time blows out the arcs.

5. In a heating and ventilating system, a fuel consuming stove, a draft regulator therefor, means for supplying air to an air heating chamber therein, an electromagnetic device for controlling said air supplying means, a direct connection from a moving part of said electromagnetic device to said draft regulator, an electric circuit including said electromagnetic device, and a thermostat affected by the temperature of the apartment to be heated and adapted to control said circuit.

In witness whereof, I have hereunto signed my name in the presence of two subscribing witnesses.

FRANK A. KUNTZ.

Witnesses:
   F. T. KITCHEN,
   F. BARAS.